United States Patent [19]

Itoh et al.

[11] Patent Number: 5,044,093
[45] Date of Patent: Sep. 3, 1991

[54] SPRAY-DRYING GRANULATION APPARATUS

[75] Inventors: Takashi Itoh; Masayuki Serizawa; Masaaki Ohkawara, all of Yokohama, Japan

[73] Assignee: Ohkawara Kakohki Co., Ltd., Yokohama, Japan

[21] Appl. No.: 515,781

[22] Filed: Apr. 25, 1990

Related U.S. Application Data

[63] Continuation of Ser. No. 177,265, Apr. 4, 1988, abandoned.

[51] Int. Cl.$^5$ .............................. F26B 17/00
[52] U.S. Cl. ................................. 34/57 R; 34/57 A; 34/57 D; 34/60; 159/DIG. 3
[58] Field of Search ............... 34/57 R, 10, 57 A, 60, 34/12; 159/DIG. 3, 48.1, 17.1, 25.1, 4.01, 16.1

[56] References Cited

U.S. PATENT DOCUMENTS 3,475,132 10/1969 Seifert et al. .................. 34/57 R
4,702,799 10/1987 Tuot ............................. 34/57 R

FOREIGN PATENT DOCUMENTS

1667205 7/1970 Fed. Rep. of Germany.
171797 6/1983 U.S.S.R. .

Primary Examiner—Henry Bennett
Attorney, Agent, or Firm—Armstrong, Nikaido, Marmelstein, Kubovcik & Murray

[57] ABSTRACT

A spray-drying granulation apparatus having: a spray drying section formed in an upper position of a chamber wherein sprayed feed liquid particles are dried to powder by a hot-air; and a powder granulation section formed in a power position of the chamber, and provided with a nozzle for feeding a binder liquid. There is no need of maintaining sticky powder or completely dried powder to the lower section. The sprayed particles can be dried to powder in a wide drying range before they are granulated in the granulation section by a binder liquid. The degree of granulation can be selected as desired while preventing attachment of powder to the inner wall of the chamber due to incomplete drying.

8 Claims, 6 Drawing Sheets

A: THIS INVENTION
B: FIG. 5
C: FIG. 6

AMOUNT OF MOISTURE CONTAINED IN THE POWDER OBTAINED IN THE SPRAY DRYING SECTION

SPRAY-DRYING GRANULATION APPARATUS

This application is a continuation of application Ser. No. 177,265 filed Apr. 4, 1988 abandoned.

BACKGROUND OF THE INVENTION

This invention relates to a spray-drying granulation apparatus mainly constituted by a chamber which incorporates a granulation section.

In general, a powder obtained by spray drying is very fine and has an average particle size of about several tens to several hundreds of microns (e.g., 30 to 120 $\mu$m). If such a powder is directly handled, it tends to be raised like dust or become undissolved lumps when dissolved in water, and has a low fluidity. To cope with these defects, the process of forming such powder is in many cases designed to be followed by a granulation process in which fine powder obtained by spray drying is aggregated (the average particle size after granulation is, in general, 3 to 6 times larger than that before the granulation).

The particle size of granules is changed depending upon the use of the granule product For instance, a creamy powder is used as, so to say, fine granules of a particle size of 400 to 800 $\mu$m, a raw material of a herb medicine is used as granules of a particle size of 150 to 400 $\mu$m from which tablets are formed, and an antibiotic needs to be granulated to have a particle size of 80 to 200 $\mu$m.

Regarding to granulation of powder, a type of apparatus for successively forming granules is known in which a binder liquid is sprayed to powder which is suspending in an upward flow of a fluid (chiefly, air) and granules are successively formed by aggregation effected by the binder. This method utilizes aggregating phenomena due to the moisture in powder in order to form granules. It is said that the water content of powder ranges from 5 to 15% in the case of granulation of a powder such as powdered milk where the powder is allowed to have a water content varying over a comparatively wide range, and that it ranges from 5 to 8% in the case of an amino-acid containing material such as soy sauce or a solution of various extracts. However, in an actual apparatus, the progress of granulation is slow if the moisture (water content) of the powder is low, or the powder attaches to the apparatus or becomes lumps like dumpling if it is high. Thus, the suitable water content range is very narrow. For example, it is several percent in the case of powdered milk, and smaller than 1% in the case of an amino-acid containing material. Therefore, highly improved skill is needed to control the water content.

A combination of a spray drying apparatus and a fluidizing-granulation apparatus can be used to constitute a system for forming granules from liquid raw-materials. The following two types of apparatus have been proposed on the basis of this concept, though they leave some problems.

Figure 5:
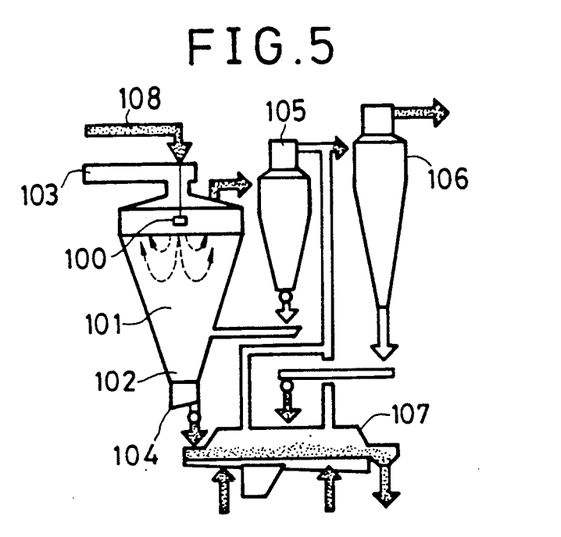
FIG. 5 is a skeleton diagram of a conventional spray dryer having a fluidized bed.

FIG. 5 shows a spray drying apparatus which is mainly constituted by a vessel which incorporates a fluidized-bed section. In FIG. 5 is illustrated a nozzle 100, a spray-drying section 101, a fluidizing-granulation section 102, drying hot air inlet 103, fluidized-bed-air introducing section 104, a first cyclone 105, a second cyclone 106, a product discharge vessel 107, and a feed liquid 108. In this well-known apparatus, the nozzle 100 for spray drying also serves as a nozzle for spraying a binder liquid for fluidization granulation, and the water content of the dried materials cannot be adequately reduced during spray drying. This is because granulation cannot be effected if the water content of the materials is lower than a certain level.

For this reason, the selection of factors including the relationship between the dispositions of the spray drying section 101 and the fluidizing-granulation section 102, the spraying angle of the nozzle, the viscosity and the density of the liquid to be sprayed, the diameter of liquid droplets, the temperatures and the flow rates of hot air and fluidization air, and so forth is very complicated, the range of suitable setting is very narrow.

The dried materials after spray drying are in an incompletely dried state and tends to attach the inner wall of the vessel. There is therefore a possibility of the attached materials being heat-denatured or a possibility of the operation becoming impossible by an increase of the amount of attached materials.

The degree of granulation is entirely determined by the drying conditions, and it is impossible to desirably change the size of granules.

Figure 6:
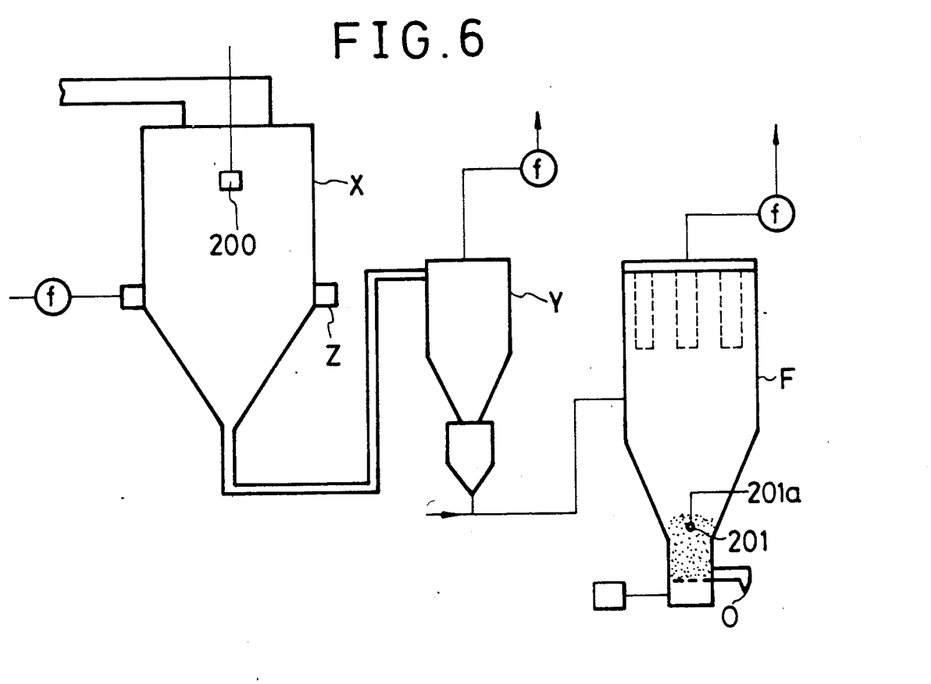
FIG. 6 is a skeleton diagram of a conventional apparatus having a separated granulation unit.

An apparatus, such as that shown in FIG. 6, having a spray drying section X, powder collecting section Y and a fluidizing-granulation section F with binder feeding nozzle 201 provided in separate chambers has also been put into use. However, this apparatus requires a high construction cost as well as a high running cost. A. reference character O in FIG. 6 denotes a product outlet.

In the spray drying section, it is necessary to adequately dry particles in order to supply them to the succeeding section and, in general, necessary to reduce the temperature or moisture of the exhaust. It is thereby desired to supply secondary air Z into the chamber and provide additional equipment of a large capacity including a blower and a wet scrubber used as after treatment equipment for the supply of secondary air.

The fluidizing-granulation section is provided with a bag filter device F, and thereby becomes difficult to wash.

Figures 7, 8:
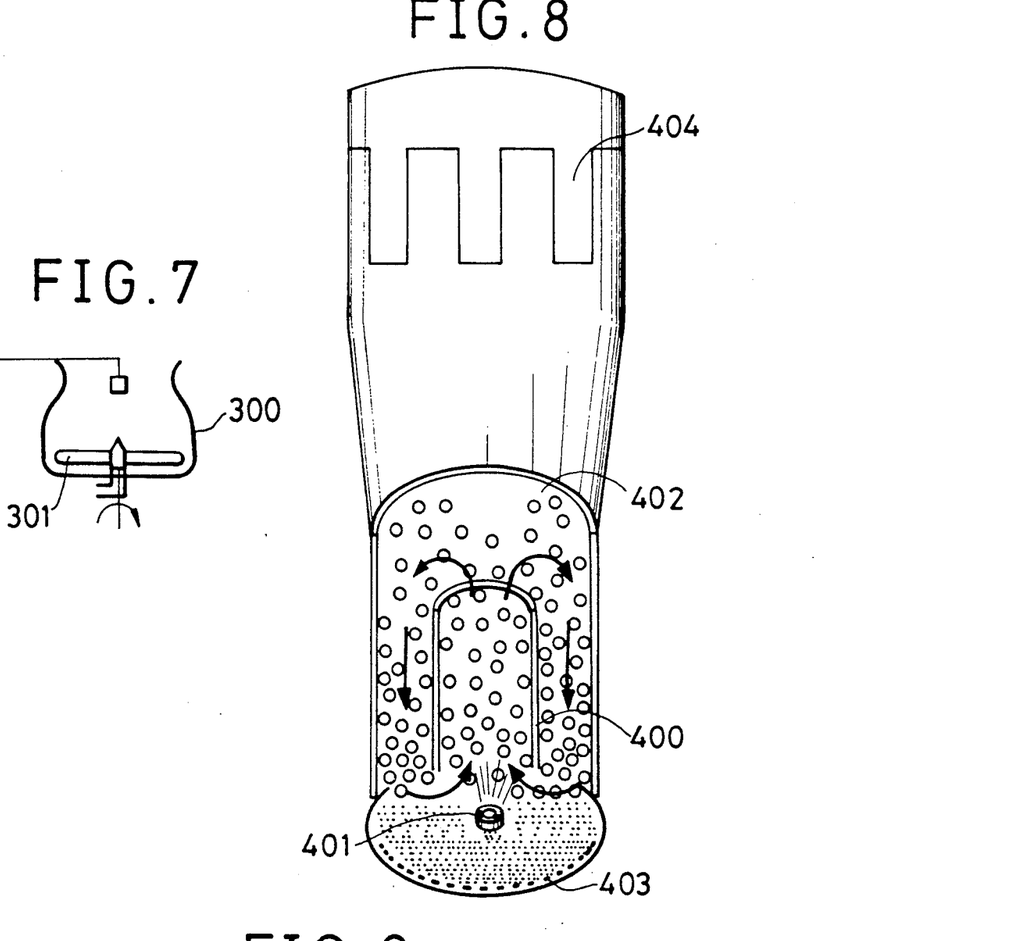
FIG. 7 is an illustration of a conventional agitating-granulation apparatus.
FIG. 8 is an illustration of a conventional spouted bed granulation apparatus.

FIG. 7 shows another type of apparatus which successively forms granules by supplying a raw-material powder, spraying, in an agitation vessel 300, the powder with a binder liquid, agitating the sprayed powder by agitating blades 301 so as to form circulation flows like vortexes (refer to "Saishin Zoryu-gijutsu no Jissai (actualities of newest granulation technique)" (Sogo Gijutsu Shiryo Shu), published by Kanagawa-ken Keiei Kaihatsu Center (management development center of Kanagawa prefecture), 1984, pp 36–39). This apparatus is also based on the method that utilizes aggregating phenomena due to the moisture in the powder in order to form granules. As described above, it is said that the water content of powder ranges from 5 to 15% in the case of granulation of a powder such as powdered milk where the powder is allowed to have a water content varying over a comparatively wide range, and that it ranges from 5 to 8% in the case of an amino-acid containing material such as soy sauce or a solution of various extracts. However, in an actual apparatus, the progress of granulation becomes slow if the moistness (water content) of the powder is reduced, or the powder attaches to the apparatus or becomes lumps like dumpling if the moistness is high. Thus, the suitable water content range is very narrow. For example, it is several percent in the case of powdered milk, and smaller than 1% in the case of an amino-acid containing material. Therefore, highly improved skill is needed to control the water content.

FIG. 8 shows a so-called Wurster apparatus which is known as a granulation apparatus using a spouted bed granulater with draft tube (refer to "Dai-San-Kai Seizai To Ryushi Sekkei Symposium Koen Yoshi Shu (essentials of lectures in third symposium of formulation and particle design)" published by Ryushi Sekkei Bukai of Funtai Kogaku Kai, Nov. 27, 28, 1986, pp 71–74). In this Wurster apparatus, particles are drawn in by upward flows formed inside a draft tube 400, are blown upward while being sprayed with a binder liquid supplied from a nozzle 401, lose in speed, and start to fall in an expanded section 402 (or is carried on the flows), thus being circulated. Particles accumulated on the bottom are fluidized by air supplied through a perforated plate 403, and are successively drawn into the draft tube 400.

If powder which is prepared by a batch-wise apparatus and which has a wide particle size distribution is processed by this granulation apparatus, there is a possibility of smaller particles segregating, that is, attaching by static electricity to the wall surface or a bag filter 404 disposed in an upper section, or flying to the bug filter 404 by deviating from the circulation flows. This phenomenon reduces the uniformity of granulation.

SUMMARY OF THE INVENTION

It is therefore a general aim of the present invention to provide a spray-drying granulation apparatus which is free from the above described problems of the conventional technique.

In this regard, it is an object of the present invention to provide a spray-drying granulation apparatus which enables a wide range of setting of operating conditions with respect to various kinds of raw-material.

It is another object of the present invention to provide a spray-drying granulation apparatus capable of preventing dried material from attaching to its inner wall.

To this end, the present invention provides a granulation apparatus having a spray drying section and a granulation section, the spray drying section and the granulation section being formed in one chamber, the granulation section having a granulation binder liquid supply nozzle and/or an agitating means provided separately from a feed liquid supply atomizer provided in the spray drying section.

The processing performed by the granulation section is fluidizing granulation, agitating granulation, or spouted bed granulation.

Therefore, the apparatus in accordance with the present invention is generally divided into three types.

In the case of fluidizing granulation, a spray drying section and a fluidizing granulation section are formed in one chamber, and a nozzle for supplying a fluidizing-granulation binder liquid is provided in the fluidizing granulation section separately from a feed liquid supply atomizer provided in the spray drying section.

In the case of agitating granulation, a spray drying section and an agitating granulation section are integrally formed in one vessel, and an agitating means is provided in the agitating granulation section.

Preferably, in most cases, the agitating granulation section is provided with a nozzle for supplying an agitating-granulation binder liquid separately from a feed liquid supply atomizer provided in the spray drying section, but the provision of the binder supply nozzle is not always necessary.

In the case of spouted bed granulation, a spray drying section and a spouted bed granulation section are formed in one chamber, a nozzle for supplying a spouted bed granulation binder liquid is provided in the spouted bed granulation section separately from a feed liquid supply sprayer provided in the spray drying section, and a draft tube of a desired size is disposed above the binder supply nozzle.

Figure 9:
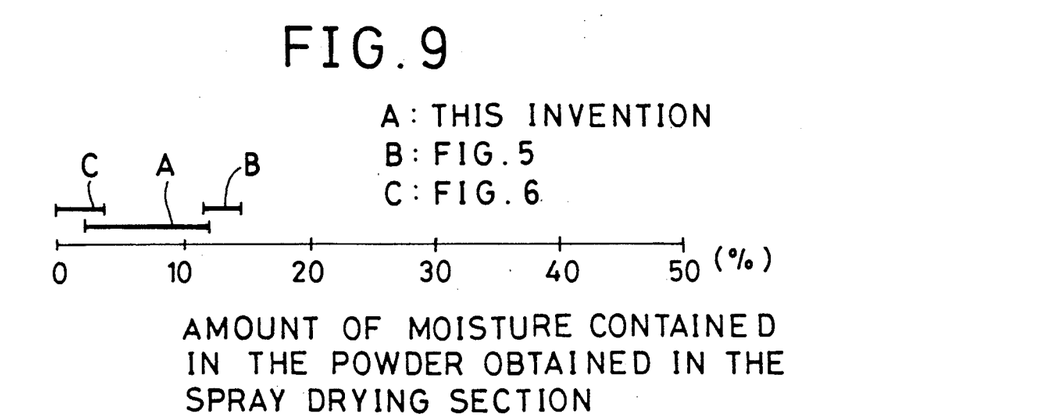
FIG. 9 is a drawing showing amount of moisture contained in the powder obtained in the spray drying section.

Each of these arrangements of the present invention ensures that dry powder formed from the feed liquid is dried in the spray drying section so as to have a water content which widely varies (see A of FIG. 9) as between an incompletely dried state (see B of FIG. 9) and a completely dried state (see C of FIG. 9) and, in the granulation section, the dried material is supplied with a binder and an amount of moisture suitable for granulation. It is therefore possible to prevent the dried material from attaching to the inner wall of the spray drying section and also possible to setting a wide range of operating conditions with respect to various kinds of raw-material.

Starch, dextrin, HPC, CMC, MC, or the like can be used as the granulation binder in accordance with the present invention as well as water or the feed liquid processed by spray drying (used in common). Specifically, the feed liquid is preferably used in common for the granulation of powdered milk or amino-acid containing product, thereby reducing thermal energy consumption.

The degree of granulation can be changed by adjusting the rate at which the binder is added, the density of the binder, and the time period of residence in the granulation section. Other objects and advantages will become apparent upon reading the following detailed description.

DESCRIPTION OF PREFERRED EMBODIMENTS

Preferred embodiments of the present invention will be described below.

A spray-drying granulation apparatus which has a fluidizing-granulation section and which represents an embodiment of the present invention will first be described.

Figure 1:
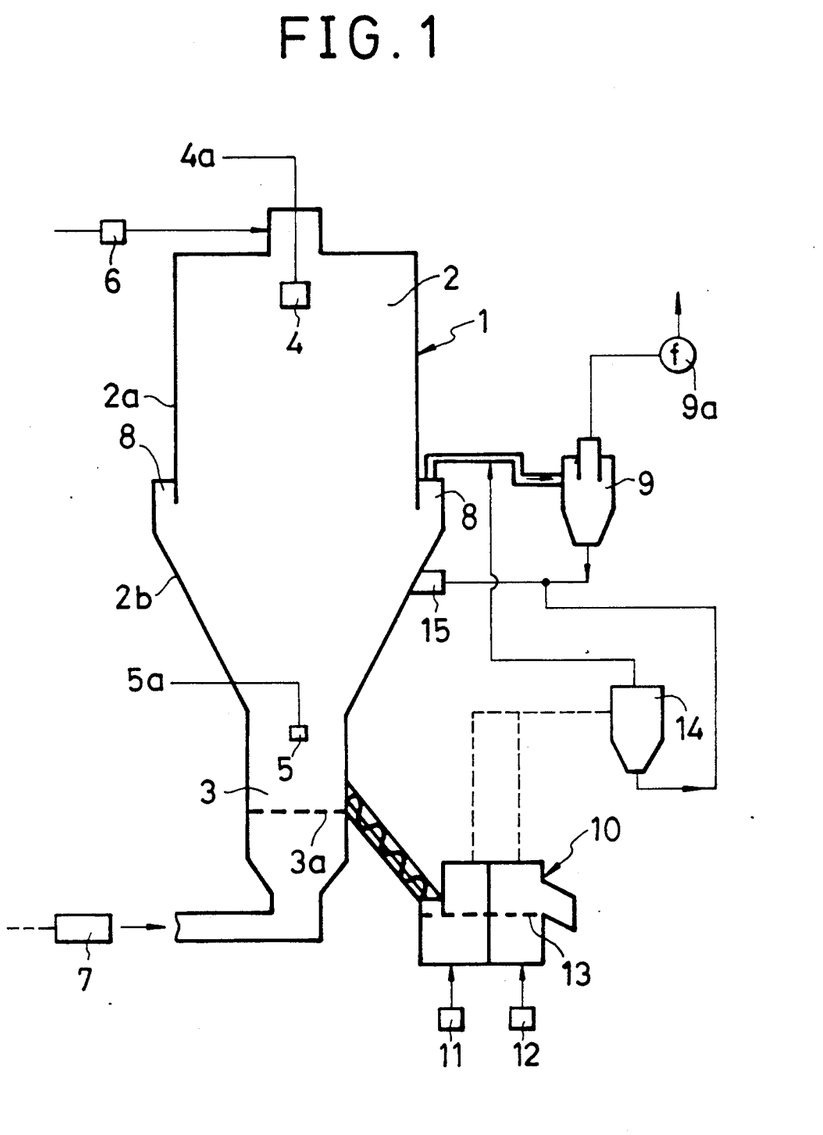
FIG. 1 is a schematic illustration of a spray-drying granulation apparatus which represents an embodiment of the present invention.

FIG. 1 shows a main body 1 of the apparatus which has a spray drying section 2 provided in its upper portion, and a fluidizing-granulation section 3 provided in its lower portion. The spray drying section 2 is constituted by a cylindrical portion 2a and a cone-shaped portion 2b. The main body of the apparatus is provided with: a feed liquid spraying nozzle 4 such as a pressure nozzle, two-fluid nozzle, or rotary-disk sprayer; a binder supply nozzle 5 such as a two-fluid nozzle for supplying a granulation binder liquid; a hot air blower 6 for spray drying; a fluidized-bed-air blower 7; and a hot air outlet 8 through which the exhaust is discharged from the spray drying section 2 and the fluidizing-granulation section 3. The hot air outlet 8 is formed at the lower end of the cylindrical portion 2a and at the upper end of the cone-shaped portion 2b and thus has an annular configuration.

A first cyclone 9 for recovering fine particles from the exhaust is provided. Fine particles recovered by the first cyclone 9 are refluxed to the fluidizing-granulation section 3 via a recovered-particle inlet 15. The first cyclone 9 is provided with an exhauster 9a.

A unit 10 for drying and cooling products taken out of the fluidizing-granulation section 3 is provided. This drying and cooling unit may be of a well-known type of lateral fluidized bed dryer. Hot air 11 and cool air 12 supplied from the underside of a floor 13 are blown into the drying and cooling unit 10.

A second cyclone 14 processes the exhaust from the product drying and cooling unit 10, and the exhaust from this cyclone joins the exhaust flow of the first cyclone 9, thereby being discharged outside the system. The fine particles recovered by the second cyclone 14 are refluxed to the recovered-particle inlet 15.

The operation of this apparatus will be described below.

In the spray drying section 2, a feed liquid is atomized by the feed liquid supply nozzle 4, and droplets thereby formed are dried by hot air blown into this section by the hot air blower 6 so that they become fine particles. The fine particles fall through the interior of the cylindrical portion 2a while being dried, and reach the cone-shaped portion 2b. The drying hot air is exhausted to the outside via the hot air outlet 8. The material is dried as dry particles having a water content of about 4% and easy to process, since, as will be described later by way of example, it is not necessary to maintain the water content of the dried material at, for example, about 7%. This enables the dryness of particles formed in the fluidizing granulation manner to be remarkably higher than that in the case of the conventional fluidized-bed-incorporation type of granulation method shown in FIG. 5, and is effective for preventing the dried material from attaching to the cone-shaped portion 2b within a wide range of operating conditions.

In the fluidizing-granulation section 3, a granulation binder liquid is sprayed from the binder supply nozzle 5, thereby forming granules. In this case, the degree of granulation can be changed by selecting the rate at which the granulation binder liquid is supplied. The hot air exhausted from the fluidizing-granulation section 3 is discharged via the hot air outlet 8.

Next, an example of a spray-drying granulation apparatus which has an agitating-granulation section will be described below.

Figure 2:
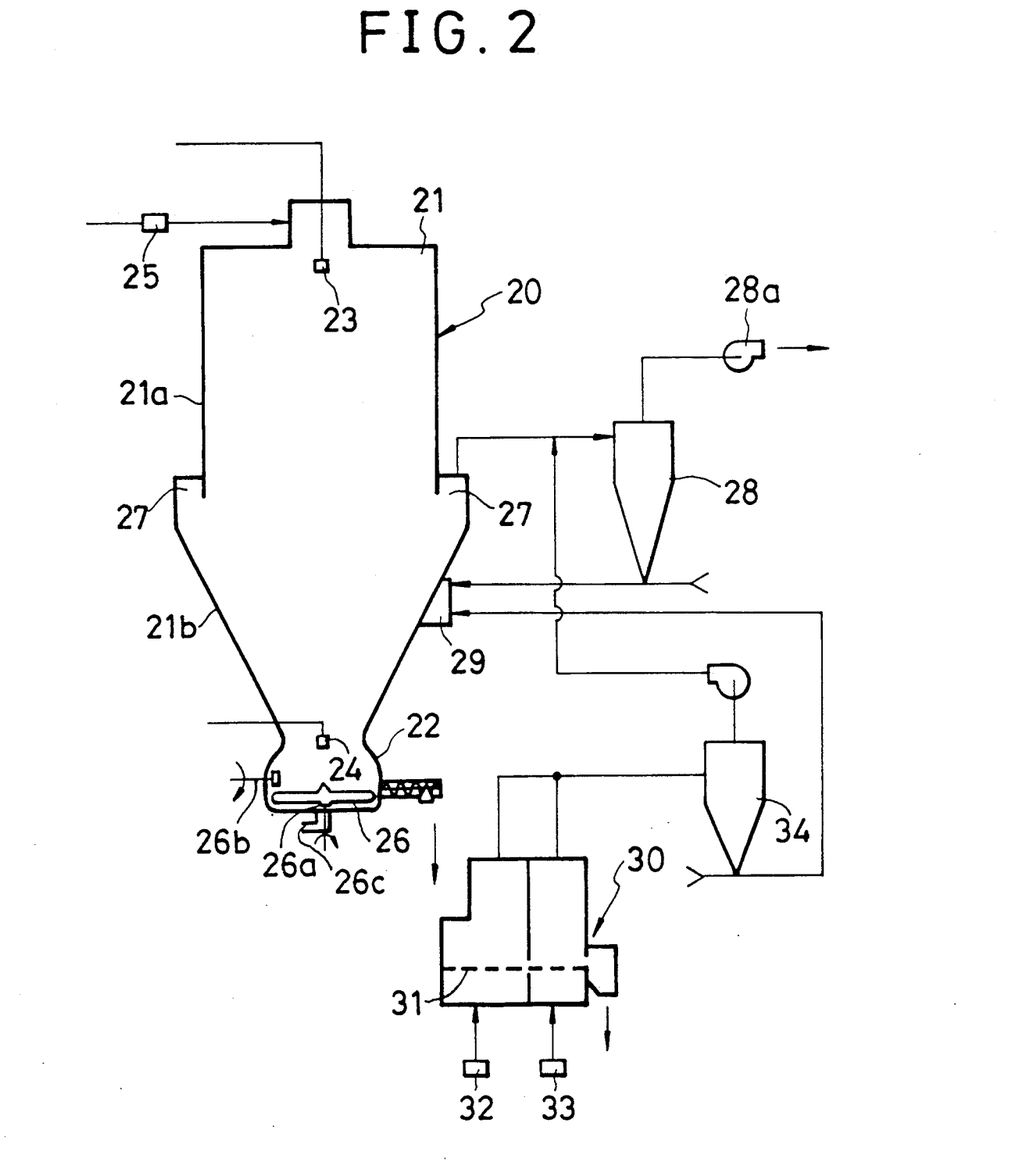
FIG. 2 is a schematic illustration of a spray-drying granulation apparatus which represents another embodiment of the present invention.

FIG. 2 is an schematic illustration of a spray-drying-agitation granulation apparatus which represents another embodiment of the present invention. As shown in FIG. 2, a main body 20 of the apparatus has a spray drying section 21 provided in its upper portion, and an agitating-granulation section 22 provided in its lower portion. The spray drying section 21 is constituted by a cylindrical portion 21a and a cone-shaped portion 21b. The agitation section 22 is in the form of a jar. The main body of the apparatus is provided with: a feed liquid spraying nozzle 23 such as a pressure nozzle, two-fluid nozzle, or rotary-disk sprayer; a binder supply nozzle 24 such as a two-fluid nozzle for supplying a granulation binder liquid; a hot air blower 25 for spray drying; an agitating means 26 constituted by main agitating blades 26a rotatable about a vertical axis and sub agitating blades 26b rotatable about a horizontal axis; a blast opening 26c for heat-purging; and a hot air outlet 27 through which the exhaust is discharged from the spray drying section 21 and the agitating-granulation section 22. The hot air outlet 27 is formed at the lower end of the cylindrical portion 21a and at the upper end of the cone-shaped portion 21b and thus has an annular configuration. The hot air outlet 27 may be disposed in an upper portion of the cylindrical portion 21a.

A first cyclone 28 for recovering fine particles from the exhaust is provided. Fine particles recovered by the first cyclone 28 are refluxed to the agitating-granulation section 22 via a recovered-particle inlet 29. The first cyclone 28 is provided with an exhauster 28a.

A unit 30 for drying and cooling products taken out of the agitating-granulation section 22 is provided. This drying and cooling unit may be of a well-known type of lateral fluidized bed dryer. Hot air 32 and cool air 33 supplied from the underside of a floor 31 are blown into the drying and cooling unit 30.

A second cyclone 34 processes the exhaust from the product drying and cooling unit 30, and the exhaust from this cyclone joins the exhaust flow of the first cyclone 28, thereby being discharged outside the system. The fine particles recovered by the second cyclone 34 are refluxed to the recovered-particle inlet 29.

The operation of this apparatus will be described below.

In the spray drying section 21, a feed liquid is atomized by the feed liquid supply nozzle 23, and droplets thereby formed are dried by hot air blown into this section by the hot air blower 25 so that they become fine particles. The fine particles fall through the interior of the cylindrical portion 21a while being dried, and reach the cone-shaped portion 21b. The drying hot air is exhausted to the outside via the hot air outlet 27. The material is dried as dry particles having a water content of about 4% and easy to process, since, as will be described later by way of example, it is not necessary to maintain the water content of the dried material at, for example, about 7%. This enables the dryness of particles formed in the fluidizing granulation manner to be remarkably higher than that in the case of the conventional method, and is effective for preventing the dried material from attaching to the cone-shaped portion 21b within a wide range of operating conditions.

In the agitating-granulation section 22, a granulation binder liquid is sprayed from the binder supply nozzle 24, the powder is agitated by the main agitation blades 26a and the sub agitation blades 26b, thereby forming granules. In this case, the degree of granulation can be changed as desired by altering the rate at which the granulation binder liquid is supplied and by adjusting the speed of rotation of the main agitation blades 16a and/or the sub agitation blades 26b.

Next, an example of a spray-drying granulation apparatus which has a spouted bed granulation section will be described below.

Figure 3:
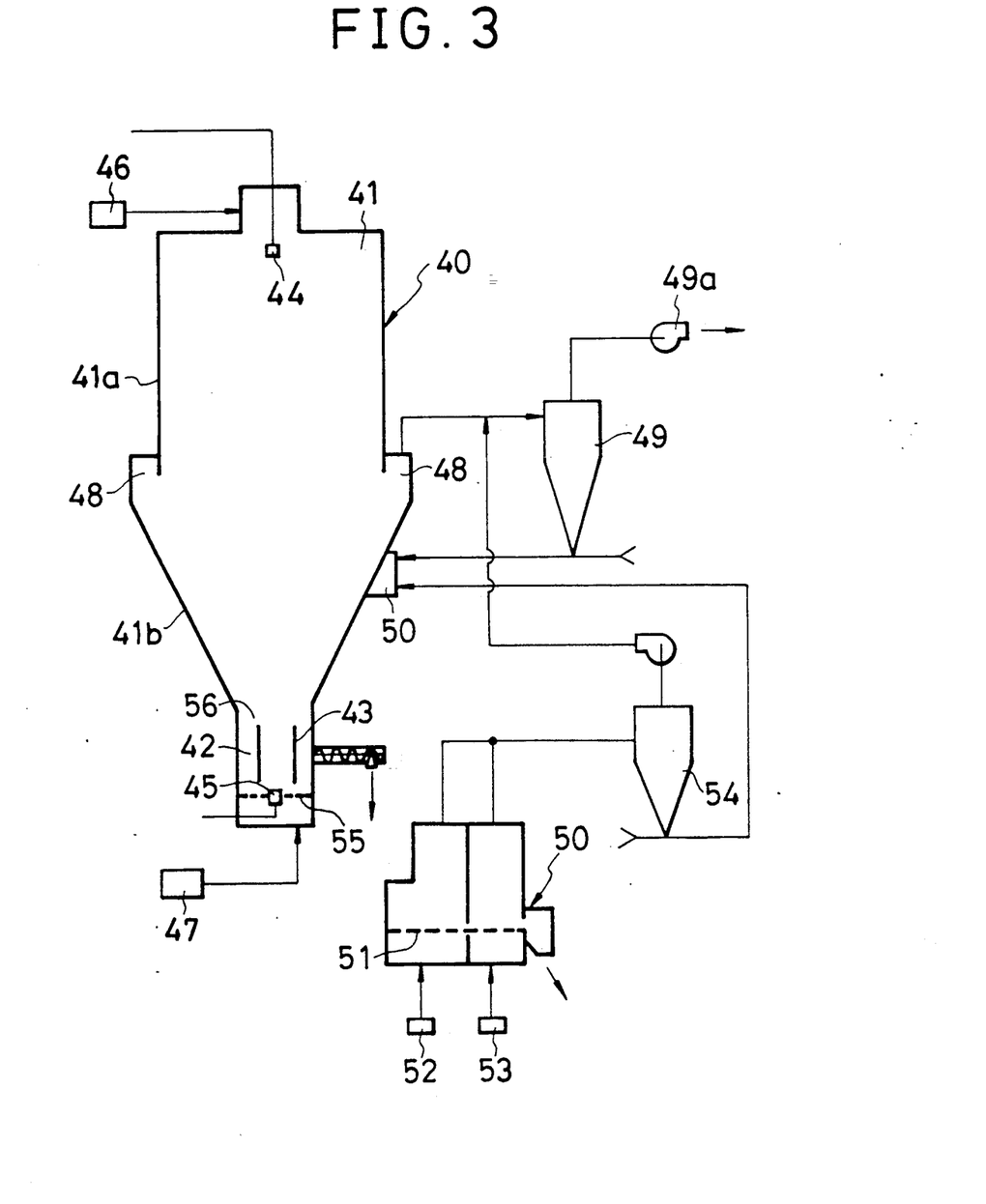
FIG. 3 is a schematic illustration of a spray-drying granulation apparatus which represents still another embodiment of the present invention.

FIG. 3 is an schematic illustration of a spray-drying spouted bed granulation apparatus which represents still another embodiment of the present invention. As shown in FIG. 3, a main body 40 of the apparatus has a spray drying section 41 provided in its upper portion, and a spouted bed granulation section 42 provided in its lower portion. The spray drying section 41 is constituted by a cylindrical portion 41a and a cone-shaped portion 41b. A draft tube 43 is disposed inside the spouted bed granulation section 42. The main body of the apparatus is provided with: a feed liquid spraying nozzle 44 such as a pressure nozzle, two-fluid nozzle, or rotary-disk sprayer; a binder supply nozzle 45 such as a two-fluid nozzle for supplying a granulation binder liquid; a hot air blower 46 for spray drying; a spouted bed blower 47; and a hot air outlet 48 through which the exhaust is discharged from the spray drying section 41 and the spouted bed granulation section 42. The hot air outlet 48 is formed at the lower end of the cylindrical portion 41a and at the upper end of the cone-shaped portion 41b and thus has an annular configuration. The hot air outlet 48 may be disposed in an upper portion of the cylindrical portion 41a.

A first cyclone 49 for recovering fine particles from the exhaust is provided. Fine particles recovered by the first cyclone 49 are refluxed to the spouted bed granulation section 42 via a recovered-particle inlet 50. The first cyclone 49 is provided with an exhauster 49a.

A unit 50 for drying and cooling products taken out of the spouted bed granulation section 42 is provided. This drying and cooling unit may be of a well-known type of lateral fluid dryer. Hot air 52 and cool air 53 supplied from the underside of a floor 51 are blown into the drying and cooling unit 50.

A second cyclone 54 processes the exhaust from the product drying and cooling unit 50, and the exhaust from this cyclone joins the exhaust flow of the first cyclone 49, thereby being discharged outside the system. The fine particles recovered by the second cyclone 54 are refluxed to the recovered-particle inlet 50.

The operation of this apparatus will be described below.

In the spray drying section 41, a feed liquid is atomized by the feed liquid supply nozzle 44, and droplets thereby formed are dried by hot air blown into this section by the hot air blower 46 so that they become fine particles. The fine particles fall through the interior of the cylindrical portion 41a while being dried, and reach the cone-shaped portion 41b. The drying hot air is exhausted to the outside via the hot air outlet 48. The material is dried as dry particles having a water content of about 4% and easy to process, since, as will be described later by way of example, it is not necessary to maintain the water content of the dried material at, for example, about 7%. This enables the dryness of particles formed in the fluidizing granulation manner to be remarkably higher than that in the case of the conventional method, and is effective for preventing the dried material from attaching to the cone-shaped portion 41b within a wide range of operating conditions.

In the spouted bed granulation section 42, a granulation binder solution is upwardly sprayed from the binder liquid nozzle 45. At the same time, particles are made to flow upward through the draft tube 43 by hot air blown thereinto via a perforated plate 55, lose in speed, and start to fall in an expanded section 56. Granules are formed during this circulative operation. In this case, the degree of granulation can be changed by altering the rate at which the granulation solution is supplied and by adjusting the particle residence time and the hot air supply rate. The hot air exhausted from the spouted bed granulation section 42 is discharged via the hot air outlet 48.

The results of experiment performed by using the apparatus in accordance with the present invention will be described below.

EXAMPLE 1

The conventional spray dryer apparatus which makes use of granulation binder nozzle as shown in FIG. 5 and the apparatus in accordance with the present invention shown in FIG. 1 were compared with each other with respect to granulation of an amino-acid containing material by an experiment as described below.

The chamber of each of the apparatus used in this comparison experiment is specified as follows:

| | |
|---|---|
| diameter of cylindrical portion 2a | 2200 mm |
| height of cylindrical portion 2a | 3000 mm |
| height of cone-shaped portion 2b | 1900 mm |

Comparison was made between two cases: one in which the granulation binder liquid nozzle 5 was provided in the fluidizing-granulation section 3 (present invention); and one in which the granulation binder liquid nozzle 5 was not provided (conventional apparatus).

Conventional apparatus:

| | |
|---|---|
| Spray drying section 2 | |
| Hot air inlet temperature | 200° C. |
| Outlet temperature | 95° C. |
| Feed liquid supply rate | 30 kg/h |
| Binder liquid density | 40% |
| Water content at the time of completion of drying | 5 to 7% |
| Fluidizing-granulation section 3 | |
| Hot air inlet temperature | 70° C. |
| Outlet temperature | 60° C. |
| Fluidizing-granulation binder supply rate | no supply |
| Granulation binder liquid temperature | no supply |
| Water content in fluidized bed | approx. 4% |
| Present invention: | |
| Spray drying section 2 | |
| Hot air inlet temperature | 210° C. |
| Outlet temperature | 95° C. |
| Feed liquid supply rate | 30 kg/h |
| Feed liquid density | 40% |
| Water content at the time of completion of drying | approx. 4% |
| Fluidizing-granulation section 3 | |
| Hot air inlet temperature | 85° C. |
| Outlet temperature | 50° C. |
| Fluidizing-granulation binder supply rate | 1.8 kg/h |
| Granulation liquid temperature | 40° C. |
| Water content in fluidized bed | approx. 4% |

After this experiment, granules of an average particle size of 100 to 150 microns were recovered in the case of the conventional apparatus. The recovery rate was about 30%, the amount of remaining raw-materials of about 70% was attached to the cone-shaped portion and a portions above the fluidized bed and could not be recovered. A recovery rate attained under other conditions was smaller than the above value. In the case of the apparatus of the present invention, substantially no amount of dried material was attached to the side wall surfaces, and granules of an average particle size of 150 microns were obtained at a recovery rate of about 90%.

When the binder flow rate was reduced to a certain value, granules of an average particle size of about 100 microns were obtained at a recovery rate of about 90%.

Figure 4:
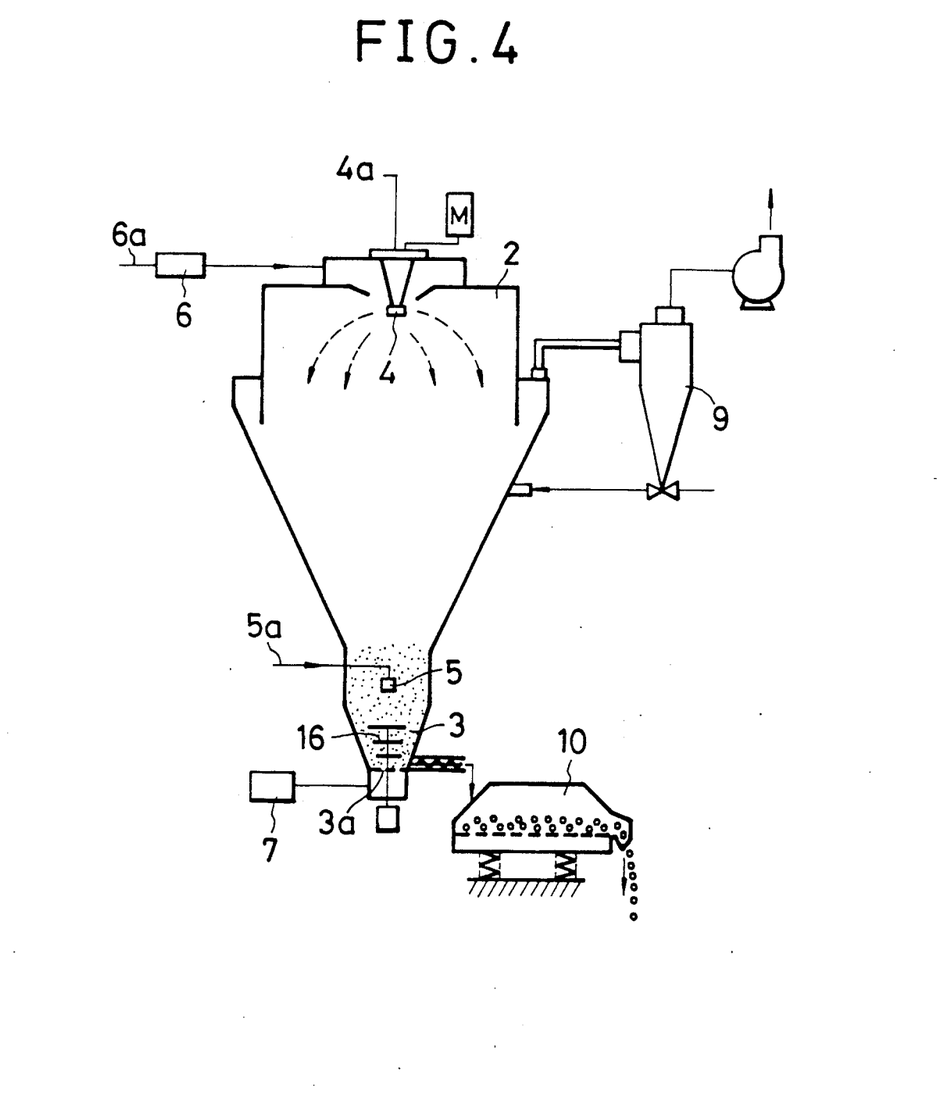
FIG. 4 is a schematic illustration of an apparatus which has a rotary disk sprayer and a rotary agitator and which represents a further embodiment of the present invention.

In accordance with the present invention, another arrangement, such as that shown in FIG. 4, is applicable. This apparatus has a rotary agitator 16 provided in the fluidizing-granulation section 3 and adapted to break granules of larger particle sizes in order to form even-sized granules.

EXAMPLE 2

The apparatus shown in FIG. 2 was used.

The chamber of this embodiment apparatus was continuously formed of an upper chamber specified by

| | |
|---|---|
| diameter of cylindrical portion 21a | 2200 mm |
| height of cylindrical portion 21a | 3000 mm |
| height of cone-shaped portion 21b | 2500 mm | and a lower chamber in the form of a jar having a height of 400 mm and a diameter of 300 mm.

| | |
|---|---|
| Spray drying section 21 | |
| Hot air inlet temperature | 210° C. |
| Outlet temperature | 95° C. |
| Feed liquid supply rate | 30 kg/h |
| Feed liquid density | 40% |
| Water content at the time of completion of drying | approx. 4% |
| Agitating-granulation section 22 | |
| Main agitating blades | φ 290 mm, 200 rpm |
| Sub agitating blades | φ 80 mm, 1450 rpm |
| Agitating-granulation binder supply rate | 1 kg/h |
| Granulation binder temperature | 40° C. |
| Water content in fluidized bed | approx. 4% |

As a result, substantially no amount of dried material was attached to the side wall surfaces, and granules of an average particle size of 150 microns were obtained at a recovery rate of about 90%.

EXAMPLE 3

The apparatus shown in FIG. 3 was used.

The chamber of this embodiment apparatus was continuously formed of an upper chamber specified by

| | |
|---|---|
| diameter of cylindrical portion 41a | 2200 mm |
| height of cylindrical portion 41a | 3000 mm |
| height of cone-shaped portion 41b | 2700 mm | and a lower chamber having a height of 650 mm and a diameter of about 180 mm, in which a draft tube having a diameter of 300 mm was disposed.

| | |
|---|---|
| Spray drying section 41 | |
| Hot air inlet temperature | 210° C. |
| Outlet temperature | 95° C. |
| Feed liquid supply rate | 30 kg/h |
| Feed liquid density | 40% |
| Water content at the time of completion of drying | approx. 4% |
| Spouted bed granulation section 42 | |
| Hot air inlet temperature | 70° C. |
| Outlet temperature | 60° C. |
| Granulation binder supply rate | 1.5 kg/h |
| Granulation binder temperature | 40° C. |
| Water content in spouted bed | approx. 4% |
| Average residence time | 20 min |

As a result, substantially no amount of dried material was attached to the side wall surfaces, and granules of an average particle size of 100 microns were obtained at a recovery rate of about 90%.

When the binder flow rate was reduced to a certain level, granules of an average particle size of about 100 microns were obtained at a recovery rate of about 90%.

Thus, the apparatus in accordance with the present invention is advantageous in the following respects:

a) Since the granulation nozzle is provided in the granulation section separately from the feed liquid suppling atomizer, there is no need for maintaining an incompletely dried state of spray-dried fine particles in which the water content is high. Therefore, fine particles can be dried in a wide drying range and can be granulated by the binder liquid in the granulation section without attaching to the inner wall surface of the chamber, thus improving the rate at which the granules are recovered.

b) The degree of granulation in the granulation section can be adjusted irrespective of the upper drying section by adjusting the rate at which the granulation binder liquid is supplied.

c) The exhaust temperature can be reduced with respect to every sections of the invented apparatus while setting the temperature of the hot air high. It is therefore possible to produce a large amount of granules with small energy consumption. In addition, there is no need for the provision of fine particles in the spray drying section and, hence, the use of secondary cool air, which are needed by the apparatus having a separated granulation unit.

The present invention thus enables even a special raw-material, such as an amino-acid containing material, of a narrow water content range suitable for granulation to be successively granulated under comparatively relaxed operating conditions.

What is claimed is:

1. A spray-drying granulation apparatus comprising:
   a chamber;
   a spray drying section formed in said chamber at an upper portion thereof and including a feed liquid supply atomizer for supplying a feed liquid and means for supplying hot air to dry said feed liquid to a powder having a moisture content sufficiently low to prevent the powder from attaching to the chamber; and
   a fluidized-bed granulation section formed in a lower portion of said chamber for fluidizing and moving powder discharged from said spray drying section, said granulation section including a spray nozzle for feeding a binder liquid to said powder in said fluidized-bed granulation section to increase the moisture content of the powder to control granulation thereof; and
   means for discharging a granulated product from said fluidized-bed granulation section.

2. A spray-drying granulation apparatus according to claim 1, comprising a device for successively taking wherein said spray drying section is constituted by a cylindrical portion and a cone-shaped portion disposed under said cylindrical portion, and wherein said fluidized-bed granulation section is in the form of a cylinder and is continuously formed with the lower end of said cone-shaped portion.

3. A spray-drying granulation apparatus according to claim 1, wherein said feed liquid supply atomizer includes a pressure spray nozzle.

4. A spray-drying granulation apparatus according to claim 1, wherein said feed liquid supply atomizer includes a two-fluid spray nozzle.

5. A spray-drying granulation apparatus according to claim 1, wherein said feed liquid supply atomizer is of a rotary disk type.

6. A spray-drying granulation apparatus according to claim 1, wherein said binder liquid supply nozzle provided in said granulation section includes a two-fluid spray nozzle.

7. A spray-drying granulation apparatus comprising:
a chamber;
a spray drying section formed in said chamber at an upper portion thereof and including a feed liquid supply atomizer for supplying a feed liquid and means for supplying hot air to dry said feed liquid to a powder having a moisture content sufficiently low to prevent the powder from attaching to the chamber; and
an agitating-granulation section formed in a lower portion of said chamber for agitating and moving powder discharged from said spray drying section, said granulation section including a main blade rotatable about a vertical axis, a sub-agitating blade rotatable about a horizontal axis and a spray nozzle for feeding a binder liquid to said powder in said granulation section to increase the moisture content of the powder to control granulation thereof; and
means for discharging a granulated product from said agitating-granulation section.

8. A spray-drying granulation apparatus comprising:
a chamber;
a spray drying section formed in said chamber at an upper portion thereof and including a feed liquid supply atomizer for supplying a feed liquid and means for supplying hot air to dry said feed liquid to a powder having a moisture content sufficiently low to prevent the powder from attaching to the chamber; and
a spouted-bed granulation section formed in a lower portion of said chamber for moving powder discharged from said spray drying section, said granulation section including a spray nozzle for feeding a binder liquid to said powder in said granulation section to increase the moisture content of the powder to control granulation thereof; and
means for discharging a granulated product from said spouted-bed granulation section.

* * * * *